United States Patent [19]
Raghavan et al.

[11] Patent Number: 6,075,810
[45] Date of Patent: Jun. 13, 2000

[54] NRZ AND BIPHASE-L FORMATTED HEXAPHASE MODULATED GPS TRANSMISSION METHOD

[75] Inventors: Srinivasa H. Raghavan, Rancho Palos Verdes; Jack K. Holmes, Los Angeles, both of Calif.

[73] Assignee: The Aerospace Corporation, El Segundo, Calif.

[21] Appl. No.: 09/014,471

[22] Filed: Jan. 28, 1998

[51] Int. Cl.[7] .................................................. H04B 15/00
[52] U.S. Cl. ........................ 375/200; 375/202; 375/206; 375/208; 342/352
[58] Field of Search ................................... 375/200, 202, 375/206, 208; 370/320, 335; 342/352, 357; 380/274

[56] References Cited

U.S. PATENT DOCUMENTS

| | | | |
|---|---|---|---|
| 5,381,446 | 1/1995 | McIntosh | 375/200 |
| 5,400,359 | 3/1995 | Hikoso et al. | 375/202 |
| 5,469,470 | 11/1995 | Tankahashi | 375/208 |
| 5,923,287 | 7/1999 | Lennen | 342/357 |

*Primary Examiner*—Stephen Chin
*Assistant Examiner*—Shuwang Liu
*Attorney, Agent, or Firm*—Derrick Michael Reid

[57] ABSTRACT

An NRZ and biphase-L formatted, three code hexaphase modulated GPS signal transmission communication method provides for the simultaneous modulation of the C/A code, the P(Y) code and a NEW code all modulating a single carrier for GPS use in one or both L1 and L2 bands. The use of the C/A code and the P(Y) code which are NRZ formatted with a NEW code biphase-L formatted and using hexaphase modulation on the three signals provides for spectral separation between the C/A code signal and the NEW code signal, all three modulated on a single carrier frequency.

12 Claims, 8 Drawing Sheets

NRZ & Biphase-L Formatted Hexaphase Modulated Transmitter System

NRZ Formatted Quadriphase Modulated Transmitter System (Prior Art)

NRZ Formatted Quadriphase Modulated Receiver System (Prior Art)

Code Spectral Density (Prior Art)

Quadriphase Signaling (Prior Art)

L1 QPSK Modulator (Prior Art)

NRZ and Biphase-L Formatted Quadriphase Modulated Transmitter System

NRZ and Biphase-L Formatted Quadriphase Modulated Receiver System

NRZ & Biphase-L Formatted Hexaphase Modulated Transmitter System

NRZ & Biphase-L Formatted Hexaphase Modulated Receiver System

Code Spectral Density

Hexaphase Signaling

L1 Hexaphase Modulator

NRZ AND BIPHASE-L FORMATTED HEXAPHASE MODULATED GPS TRANSMISSION METHOD

REFERENCE TO RELATED APPLICATION

The present application is related to applicant's copending application entitled: "NRZ & Biphase-L Formatted Quadriphase Modulated GPS Transmission Method", Ser. No. 09/014,958, filed Jan. 28, 1998, by the same inventors.

STATEMENT OF GOVERNMENT INTEREST

The invention was made with Government support under Contract No. F-04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the field of Global Position Systems (GPS) and methods for transmitting GPS signals. More particularly, the present invention relates to generating GPS signals having different frequency spectra with improved spectral separation.

BACKGROUND OF THE INVENTION

The Global Positioning System (GPS) includes a constellation of earth orbit satellites transmitting L band signals to GPS receivers using code division multiple access (CDMA) codes. The GPS transmitting satellites use CDMA direct sequence spectrum spreading and the GPS receivers use despreading to acquire encoded data signals transmitted on the two L1 and L2 band signals. These direct sequence CDMA codes are tracked and derive pseudo range estimates used in estimating a navigation solution. Exemplar NRZ formatted quadriphase modulated transmitter and receiver systems are respectively shown in FIGS. 1A and 1B. Spectrum spreading during transmission and spectrum despreading during reception enables reliable reception of the embedded data signals for providing the pseudo range estimates. The exemplar prior art transmitter and receiver systems of FIGS. 1A and 1B use GPS signals having related spectral densities as shown in FIG. 2A, by quadriphase signaling shown in FIG. 2B, using modulators, such as an exemplar L1 QPSK modulator shown in FIG. 2C, all of which use reference designations 10–99.

Referring to FIG. 1A, a GPS transmitter system typically includes an uplink antenna 10 receiving S band signals providing orbital, almanac and ephemeris data to a command and telemetry subsystem 12 which communicates ephemeris data 11a to the baseband processor 13. The ephemeris data at 50 bits per second (bps) 11a is communicated to a baseband processor 13. The clock generator 14 includes an internal reference clock which is used to generate various required clocking signals. The clock generator 14 provides the data clocking signal 11b to the baseband processor 13, and, provides chip rate clock signals 15a and 15b to the baseband processor 13. The clock generator 14 also provides an L1 carrier signal 16a and an L2 carrier signal 16b.

The baseband processor 13 provides a Q phase spread spectrum signal 17a and an I phase spread spectrum signal 17b to quadriphase shift keyed (QPSK) modulators 18 and 20. The Q phase and I phase spread spectrum signals 17a and 17b modulate the Q phase and the I phase of the resulting transmitted quadriphase signal. The spread spectrum signals 17a–b are digital signals having only two levels, for example, plus one and minus one. The spread spectrum signals 17a and 17b modulate the L1 and L2 frequency carrier signals 16a and 16b using modulators 18 and 20 respectively. Both L1 and L2 carrier signals 16a and 16b are modulated in phase quadrature by both of the C/A and P(Y) code spread spectrum signals 17a and 17b, respectively. The L1 carrier signal 16a has a frequency of 1.57542 GHz and the L2 carrier signal has a frequency of 1.2276 GHz. The modulator 18 provides an L1 band signal 25a which is amplified by a high power amplifier 22. The modulator 20 provides an L2 band signal 25b which is amplified by a high power amplifier 24. The Q phase quadrature modulated signal and the I phase modulated signal are modulated onto the respective L1 and L2 carriers 16a and 16b, respectively, in each of the modulators 18 and 20. As shown, both the L1 and L2 band signals 25a–b may include a P(Y) I phase modulated signal and the C/A Q phase modulated signal. Currently, the L1 band signal 25a includes a P(Y) I phase modulated signal and the C/A Q phase modulated signal, and the L2 band signal 25b includes only the P(Y) I phase modulated signal only using a binary phase shift keyed (BPSK) modulator, not shown.

The L1 and L2 band signals 25a–b are then summed together with an L3 band signal 25c using a triplexer 26 connected to a transmitting antenna 27 for transmitting all of the L band downlink signals 25a–b–c. The triplexer 26 receives the L3 band signal 25c from a nuclear detection system 28 using an L3 carrier signal 29 at 1.38105 GHz from the clock generator 14 for generating the L3 band signal also transmitted by the transmitting antenna 27. The L1 and L2 band signals are characterized as NRZ formatted, quadriphase shift keyed signals. The necessary bandwidth is 24 MHz centered around the L1 and L2 carriers 16a–b.

The baseband processor 13 receives clear access (C/A) data and precision (P(Y)) data from the command and telemetry subsystem 12. The C/A data and P(Y) data typically have the same ephemerides data communicated at fifty bps. Respective differing data at differing bit rates could be transmitted as well. The baseband processor 13 also receives necessary chip rate clocking signals 15a and 15b from the clock generator 14 to produce the Q phase and I phase spread spectrum signals 17a and 17b. There is a fixed number of chips per data bit. The baseband processor 13 generates two data modulated direct sequence spreading codes, namely the clear access C/A code and the precision P(Y) code for generating the Q phase and I phase spread spectrum signals 17a and 17b.

The C/A code is generated by a C/A code generator 30 at 1.023 mega chips per second (MCPS) chipping rate. The C/A code is formatted by non-return-to-zero (NRZ) formatter 32. The C/A data 34 is received and NRZ formatted by formatter 36 both clocked using the fifty bps clock signal 11b. This NRZ formatting is commonly referred to as NRZ formatting. A C/A code spreader 38, which functions as a multiplication mixer, spreads the NRZ formatted C/A data from formatter 36 with the NRZ formatted C/A code from formatter 32, to provide the Q phase spread spectrum signal 17a. The C/A code generator 30 is clocked by the 1.023 MCPS chip rate clock signal 15a and provides the C/A spread spectrum code that spreads the spectrum of the fifty bps NRZ formatted data 36 with the NRZ formatted C/A code. The C/A code is a well known Gold code.

Likewise, the P(Y) code is generated by a P(Y) code generator 40 but at 10.23 MCPS of the P(Y) chip rate clock signal 15b, which is ten times the chipping rate of the C/A code chip rate clock signal 15a. The P(Y) code is also formatted by a non-return-to-zero (NRZ) formatter 42. The P(Y) data 44 is received and NRZ formatted by formatter 36 using the fifty bps clock signal 11b. A P(Y) spreader 48, which functions as a mixer, spreads the NRZ formatted P(Y) data from formatter 46 with the NRZ formatted P(Y) code from formatter 42, to provide the I phase spread spectrum signal 17b. The P(Y) code generator 40 provides the P(Y) spread spectrum code that spreads the spectrum at a chip rate of 10.23 MCPS. The P(Y) code is an encrypted code for military use.

Referring to FIGS. 1A and 1B, and more particularly to FIG. 1B, a GPS receiver system typically includes a receiving antenna 51 to receive the L band signals 25a–b. The GPS receiver system receives the L band signals 25a–b from the GPS satellite transmitter system of FIG. 1A, but is shown to be configured to despread only one of the L1 or L2 band signals 25a or 25b for clarity and convenience. The L band signals 25a–b are received by the antenna 51 and then amplified by a low noise amplifier 52 providing a received L band signal 53. The L band signal 53 is despread by a C/A code despreader 54 and a P(Y) code despreader 56 using the formatted C/A code and P(Y) code, respectively. The C/A code is generated by a C/A code generator 58 connected to an NRZ formatter 60 using the 1.023 MCPS chip rate clocking signal 61. The C/A NRZ formatter 60 provides a formatted C/A code signal communicated to the C/A code despreader 54. The P(Y) code is generated by a P(Y) code generator 62 connected using a 10.23 MCPS P(Y) chip rate clocking signal also communicated to an NRZ formatter 64 providing a formatted P(Y) code signal communicated to the P(Y) despreader 56. The despreaders 54 and 56 provide despread C/A signal 55 and a despread P(Y) signal 57, respectively, to a code tracker 66 and carrier tracker 65. The code tracker 66 performs conventional code tracking using the L band signal 53 to synchronize on the received code and provides the 1.023 MCPS C/A and 10.23 MCPS P(Y) chip rate clock signals 61 and 63 for despreading the C/A and P(Y) code signals on the L band signal 53.

The carrier tracker 65 uses the despread signals 55 and 57 to demodulate the despread signals 55 and 57 on the L1 or L2 carrier signals. The carrier tracker 65 includes conventional tracking loops 70 providing orthogonal carrier signals 71a and 71b and communicated to a C/A demodulator 72 and a P(Y) demodulator 74 respectively providing C/A and P(Y) demodulated signals 73 and 75. The carrier tracker 65 enables demodulation by providing orthogonal carrier signals 71a and 71b that are in phase with the same respective carrier of the despread signals 55 and 57. The carrier signals 16a–b of the transmitter system are the same frequency as the carrier signal of the received L band signal 53 of the receiver system. The function of the tracking loops 70 is to demodulate the received carrier from the despread signals 55 and 57. The tracking loops 70 may be conventional Costas or squaring loops that maintain frequency and phase coherence of the orthogonal carrier signals 71a and 71b for demodulation of the L1 and L2 carrier signals 16a and 16b from the despread signal 55 and 57, respectively.

The C/A demodulated signal 73 is communicated to a C/A data detector 76 and a C/A bit synchronizer 77 and is used for detecting the C/A data 78. The C/A bit synchronizer 77 determines bit boundaries of the C/A demodulated signal 73. The C/A detector 76 is used to detect data bits within NRZ formatted C/A data. The C/A bit synchronizer 77 generates a fifty bps signal clock for the detector 76 for providing the C/A data 78 as a bit stream. Likewise, The P(Y) demodulated signal 75 is communicated to P(Y) data detector 79 and P(Y) bit synchronizer 80 for detecting the P(Y) data 82. The bit synchronizer 80 determines bit boundaries of the P(Y) demodulated signal 75 and generates a fifty bps clock signal for the P(Y) detector 79. The P(Y) detector 79 is used to detect data bits within NRZ formatted P(Y) data bits. The fifty bps signal 67 clocks the P(Y) detector 79 for providing P(Y) data 82 as a bit stream.

Referring to FIGS. 1A–B and 2A–C, and more particularly FIGS. 2A–C, the GPS transmitter and receiver systems are characterized as NRZ formatted quadriphase modulated systems. The spectral density 90 of the transmitted C/A code signal and the spectral density 92 of the transmitted P(Y) code signal are shown at baseband. Only the center spectral lobes are shown for clarity in FIG. 2A, but it is well understood that the spectral densities 90 and 92 have many smaller sidelobes extending well beyond the depicted frequency range from the center carrier frequency. The C/A and P(Y) code signals are on the carrier frequencies, L1 or L2, so that both can be demodulated by a carrier tracker 65 using despread signals 55 and 57. Currently only the P(Y) signal is modulated on the L2 carrier. The GPS system is based on quadriphase signaling having Q and I orthogonal signaling vectors 96a–d generated by the QPSK modulators 18 and 20.

The C/A data and C/A spreading code are modulated on Q phase vectors 96b–d and the P(Y) data and P(Y) spreading code are modulated on the I phase vectors 96a–c. The L1 QPSK modulator injects a ninety degree phase shift by phase shifter 97 to the unmodulated carrier signal 16a whereas the L2 modulator only uses the I channel. The modulated signals from mixers 98a and 98b are summed by an adder 99 to provide the L1 band quadriphase modulated signal. The orthogonal despread modulated signals 55 and 57 are respectively demodulated by demodulator 72 and 74 using orthogonal carrier signals 71a and 71b.

The C/A code spectral density 90 and the P(Y) code spectral density 92 of a transmitted L band signal have maxima at the carrier frequency. Hence, the C/A and P(Y) code signals have overlapping spectra. The overlapping spectra disadvantageously produces cross coupling between the C/A and P(Y) signals degrading system performance. A single source of interference at the carrier frequency disadvantageously interferes with both the C/A and P(Y) signals deteriorating the reception of either code signal. Hence, the spectral maximum of the signals at the center carrier frequency disadvantageously renders both code signals susceptible to interference operating at the carrier frequency. Spectrum isolation between the C/A and P(Y) code signals is desirable, but operation at the common carrier frequency disadvantageously limits spectral isolation when only NRZ formatting is used.

Any change in the GPS transmission method should be backward compatible with existing formats, modulation and carrier frequencies. One possibility is to change the format and modulation of the C/A code or P(Y) code, however, backward compatibility requires the use of the same format and modulation for the C/A and P(Y) signals. Backward compatibility necessarily suggests using existing NRZ formatters and modulators. Backward compatibility therefore makes it necessary to use the current spectrum allocation more efficiently through some type of frequency reuse or spectrum sharing to satisfy user needs.

Users of GPS have found it desirable to add a third NEW code to be included in the GPS L band allocations. The NEW code should be spectrally isolated from the C/A code signal spectrum. However, the addition of a NEW code in the L band allocations would also render it susceptible to the same interfering signals that would interfere with the C/A and P(Y) signals. The addition of the NEW code should not affect the C/A code and P(Y) code signals retaining backward compatibility.

A number of spectrum sharing techniques, such as, time division multiple access, and, frequency division multiple access, may be considered as a direct approach to achieve improved spectral separation of the C/A code with the NEW code so that only one signal is effectively interfered with by a single interfering signal. Providing the C/A code on the L2 carrier will help satisfy C/A user needs for a second frequency to not only improve the accuracy achievable, but also would standardize the overall satellite navigation architecture by having the C/A and P(Y) code signals carried by both L1 and L2 carriers. With both C/A and P(Y) signals modulating one or both L band carriers, a single interfering signal on each carrier could render both C/A and P(Y) signals unusable. Hence, it would appear desirable to create a NEW carrier for the NEW code signal having sufficient spectral separation and isolation from both the C/A and P(Y) signals. However, the use of yet another carrier would disadvantageously complicate GPS especially when no other bands are available. These and other disadvantages are solved or reduced using the present invention.

SUMMARY OF THE INVENTION

An object of the invention is to provide a global positioning system (GPS) transmission method which uses a single carrier to communicate a number of formatted spread spectrum signals modulating a single carrier yet providing spectral separation between the signals.

Another object of the invention is to provide a spread spectrum signal having spectral content that does not substantially overlap the spectrum of the other spread spectrum signal when both signals modulate a single carrier signal.

Another object of the invention is to provide a GPS transmission method for communicating a NEW code signal which is isolated from existing C/A or P(Y) code signals yet carried on the same L band carrier.

Still another object of the invention is to provide a transmission method using a NEW code signal which is isolated from existing C/A code signals on both L1 and L2 bands.

Still another object of the invention is to provide a modulating method for transmitting a L band single carrier with the C/A code signal, P(Y) code signal and a NEW code signal which is isolated from the existing C/A code signal.

Yet another object of the invention is to provide a NEW code signal which is isolated from the existing C/A code signal with backward compatibility of both the codeless squaring and codeless cross correlation receivers.

A further object of the invention is to reformat one of the existing C/A or P(Y) signals both modulating a signal carrier for isolating the signals from each other.

A further object of the invention is to provide a NEW code signal particularly formatted to provide some isolation from existing C/A and P(Y) code signals.

Still another object of the invention is to provide a transmission method for hexaphase modulating a L band single carrier with the C/A code signal, P(Y) code signal and a NEW code signal which is isolated from existing C/A code signal.

Still another object of the invention is to biphase-L format a NEW code signal for modulating an L band carrier with spectral isolation from C/A signals within the L band.

Still a further object of the invention is to use differing formats at different chipping rates using quadrature modulation, to provide sufficient isolation between one spread spectrum signal and another spread spectrum signal, both modulated by a common carrier.

The present invention is a GPS transmission method for generating L band signals having a common carrier yet are spectrally separate, that is isolated from each other, through the use of different formats and chip rates, to effectively provide spectral separation of code division multiple access (CDMA) signals transmitted and received over the GPS L band. The present invention is a method using two different chip formats during spectrum spreading of CDMA signals such that when modulated and transmitted, the signals have spectral isolation. In addition, differing chipping rates may add further spectral isolation.

In the broadest aspect of the invention, the GPS transmission method provides spectral separation by NRZ formatting at least one CDMA signal on an L band and biphase-L formatting another CDMA signal on the same L band. The biphase-L formatting uses a Manchester code referred to herein simply as biphase-L formatting. When using three code signals, for example, the C/A code signal, P(Y) code signal and a NEW code signal, preferably, the NEW code signal is biphase-L formatted while the C/A and P(Y) code signals remains NRZ formatted, so as to create spectral separation between the NEW code and the C/A code signal while also transmitting the P(Y) code on the same L band signal. Quadriphase signaling can be used to modulate the two signals together onto a common carrier. Preferably, the C/A code CDMA signal remains NRZ formatted and carried on the L1 band for backward compatibility of the C/A code signal, but could also be carried on the L2 band. The P(Y) code signal, or an arbitrary NEW code, is biphase-L formatted. The NRZ and biphase-L formatted signals can be quadriphase phase shift keying (QPSK) modulated for quadriphase signaling onto a common carrier. Preferably, both the NRZ formatted C/A code signal and the other biphase-L CDMA code signal are carried on both L1 and L2 bands.

The chipping rate for spreading the biphase-L formatted CDMA code signals may be changed for improved spectral isolation. Preferably the chipping rate for the biphase-L formatted CDMA signal is changed while the NRZ formatted CDMA signal chipping rate remains at the 1.023 mega chips per second (MCPS). The chipping rate of the biphase-L formatted CDMA signals, NEW or P(Y) code signal, can be changed, for example, to 5.115 MCPS. With differing formats and chipping rates, the spectral densities at the transmitter output will have improved spectral isolation.

Both the transmitter and receiver systems are modified to provide biphase-L formatting of one of the CDMA L1 and L2 band signals. When the NEW code is used, the NEW CODE is generated at the transmitter for spectrum spreading and is received at the receiver for spectrum despreading. The transmission method provides spectral separation between the C/A code and the NEW CDMA code signals. The spectral separation provides an ability to separate the respective signals upon reception. Improved separation also reduces the performance degradation due to cross coupling between the C/A code signal and the NEW code signal. The NEW code may be, for example, a civilian or military access code. The NEW data may be ephemeris data and/or secret military data.

An advantage of the present invention is that C/A code signal interference, which prevents reception of the C/A code signal, should not interfere with the reception of the NEW code signal and resulting navigation performance. Another advantage of the present invention is that the transmission method provides backward compatibility with existing C/A and/or P(Y) users. The NRZ and biphase-L formatted hexaphase modulation transmission method will be compatible with current codeless techniques used in GPS receivers.

In another aspect of the invention, three code signals modulate a signal carrier using NRZ and biphase-L formatting. Preferably, the NRZ formatting is used for both the P(Y) code and the C/A code and a biphase-L chip formatting used for the NEW code, with all three modulating one or both L band carriers. The P(Y) code and P(Y) data product is the I phase spread spectrum signal. The product of the formatted C/A code and the C/A data is arithmetically added to the product of the formatted NEW code and the NEW data, and this product is the Q phase spread spectrum signal. The I phase and Q phase signals modulate in quadrature a single carrier and are added together to form a octaphase modulated signal, which becomes a hexaphase modulated signal when the transmission power of the C/A code signal and the NEW code signal are equal. Equivalently, the Q phase signal can be formed by arithmetically adding the BPSK modulated product of the formatted C/A code and the C/A data to the BPSK modulated product of the formatted NEW code and the NEW data. The I phase signal can be formed from the product of the P(Y) data and the P(Y) code BPSK modulated on the I phase carrier. The composite L band signal is amplified and transmitted. The receiver is modified to demodulate the NEW code signal. The C/A, P(Y) and NEW code signals can be modulated on one or both of the L1 and L2 carriers and are backward compatible yet provide spectral isolation between the NEW code and the C/A code signals. The NEW Code can be received even during narrow band interference at the carrier frequency resulting in the loss of the C/A code signal.

The NEW code and NEW data are preferably generated at 5.115 MCPS and formatted using a biphase-L format also known as the Manchester coding. The biphase-L formatting modifies the spectral characteristics of the NEW code signal while remaining within the necessary L band bandwidth of 24.0 MHz. The formatting of the NEW code is preferably biphase-L formatting. The modification to biphase-L formatting provides for spectral separation of the CDMA signals for improved GPS communication and navigation that will allow existing C/A code signals and the NEW code to co-exist on the same carrier.

The preferred modulation is quadriphase modulation in the case of transmitting two spread spectrum signals on a single carrier, or hexaphase modulation in the case of equal C/A and NEW code powers and octaphase modulation in the case of unequal C/A and NEW code powers in the case of transmitting three spread spectrum signals on a single carrier. In the preferred form of transmitting three spread spectrum signals on a common carrier, NRZ formatting the C/A and P(Y) spread spectrum signals and biphase-L formatting of the NEW spread spectrum signal are either hexaphase or octaphase modulated. Hexaphase modulation uses three scaled levels on the Q channel at +2, 0 and −2 levels. In hexaphase modulation, when the C/A code spread spectrum signal having +/−1 levels is added for generating the Q phase spread spectrum signal to the NEW code spread spectrum signal having +/−1 levels, the Q phase spread spectrum signal will have +2, 0 and −2 levels. The three amplitude levels of the Q phase and the two amplitude level of the P(Y) I phase spread spectrum signal produce six signaling vectors defining the hexaphase modulation. When the New code and C/A code are not equal in amplitude, then the resulting L band signal modulation is octaphase modulation because the sum of the C/A code and New Code spread spectrum Q phase signal will have four levels, and not three levels.

The preferred hexaphase modulation for GPS provides for adding a NEW code signal with both of the C/A signals on the same carrier without being affected by carrier interference due to spectral isolation. This hexaphase modulation is used to provide C/A and P(Y) signal transmission backward compatibility, yet provides a NEW Code that is spectrally isolated from the C/A code signal. Hence, a three code hexaphase, or octaphase, modulation can be incorporated into GPS having backward compatibility yet providing a NEW signal which is isolated from the existing C/A signals. Hexaphase signaling is not a constant envelope signaling scheme, but predistortion can be used to reduce amplifier distortion of the output power levels. These and other advantages will become more apparent from the following detailed description of the preferred embodiment.

DETAILED DESCRIPTION OF THE PREFERRED EMBODIMENT

Embodiments of the invention are described with reference to the FIGS. 3A through 5C using reference designations as shown in the figures. Elements with reference designations 10 through 99 in the prior art FIGS. 1A through 2C retain like reference designations in the embodiment FIGS. 3A and 5C with the addition of reference designations 100 through 136 referencing modifications to the prior art.

Figure 3A:
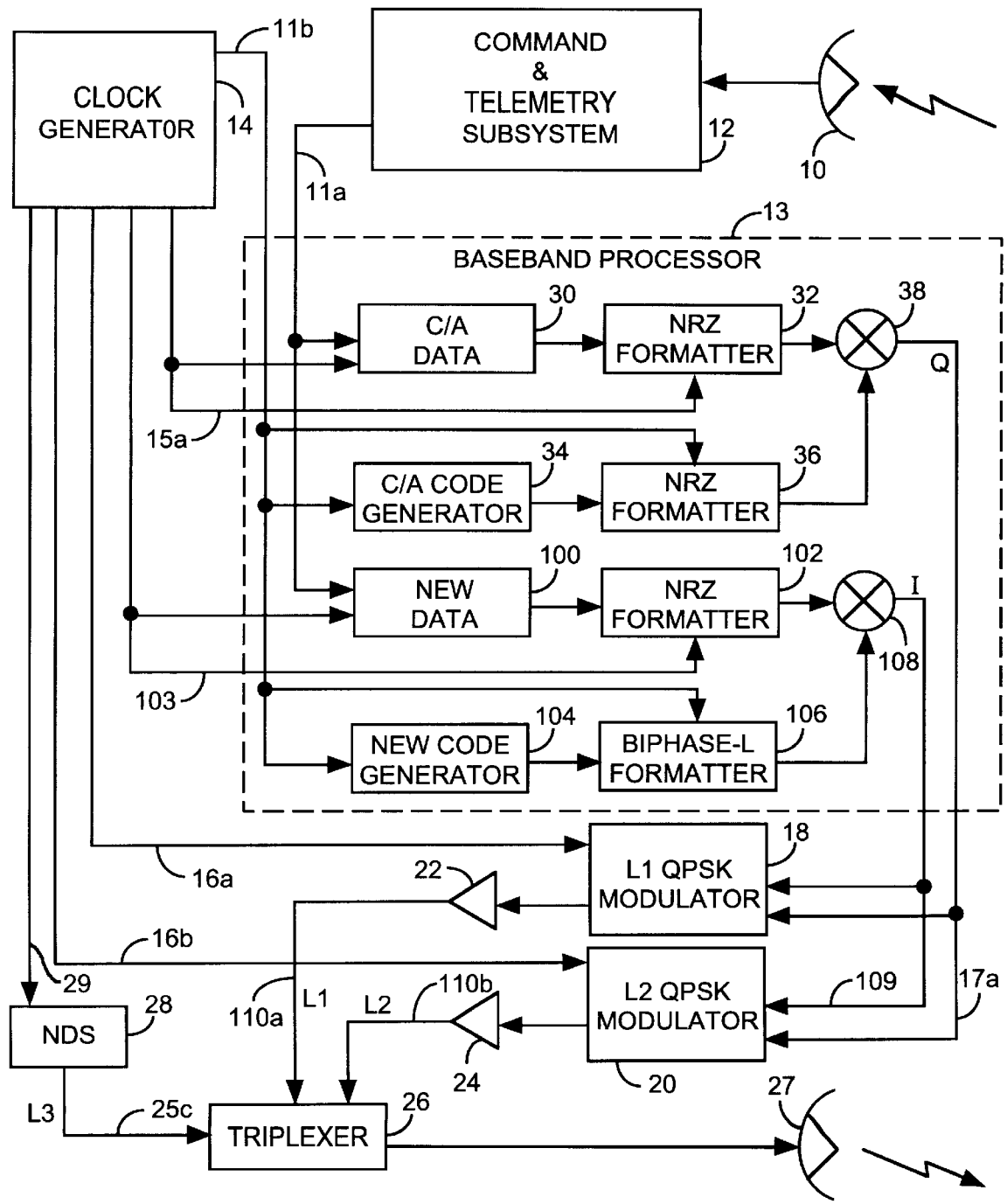
FIG. 3A is a block diagram of an NRZ and Biphase-L formatted quadriphase modulated transmitter system.

Referring to FIGS. 1A through 3A, and more particularly to the NRZ and biphase-L formatted quadriphase modulated transmitter system of FIG. 3A, NEW data 100 is NRZ formatted by formatter 102 receiving the fifty bps data signal 11a. The clock generator provides a 5.115 mega chips per second (MCPS) clock signal 103 for clocking a NEW code generator 104 and biphase-L formatter 106 providing a NEW code signal to the spreader 108. The NEW data is spread by spreader 108 providing an in phase I spread spectrum signal 109 communicated to the modulators 18 and 20. The modulators 18 and 20 provides L1 and L2 signals 110a and 110b, respectively which contain the NEW code signal. As may now be apparent by comparison to the prior art transmitter system of FIG. 1A, the P(Y) code generator 40, NRZ formatter 42, P(Y) data 44, NRZ formatter 46 and spreader 48 are collectively replaced by NEW data 100, NRZ formatter 102, NEW code generator 104, biphase-L formatter 106, and spreader 108. The NEW code generated by the generator 104 may be the P(Y) code, or may be some other arbitrary CDMA code. Likewise, the NEW data 100 could be the C/A data 34, the P(Y) data 44, or some other arbitrary data set. What is significant is that there are at least two CDMA codes, e.g. the C/A Code and NEW Code, and that one of the CDMA codes, such as the C/A code, is formatted using an NRZ formatter such as formatter 36, and the other CDMA code, such as the NEW Code, is formatted using a biphase-L formatter, such as formatter 106. The use of different formatters 36 and 106 provides spectral isolation between the two embedded CDMA code signals even when modulated upon a common carrier, such as carriers 16a or 16b within the respective L1 or L2 bands.

Preferably, the C/A code 34 spectrum is spread using 1.023 MCPS clock 15a, using the same type NRZ code formatter 36, the same NRZ data formatter 32, and the same QPSK modulators 18 and 20 for backward compatibility with existing systems, particularly transmitted over the L1 band 110a. The P(Y) code signal may separately modulate the L2 carrier 16b using a BPSK modulator. However, the C/A code 34 is preferably also modulated onto the L2 band signal 110b to enhance operational use of the C/A code signals by the users using the L2 QPSK modulator 20 for improved ionospheric correction. In the preferred form of FIG. 3A, the modification of the transmitter system to the NEW Code prevents complete backward compatibility with the use of the P(Y) code signal.

Figure 3B:
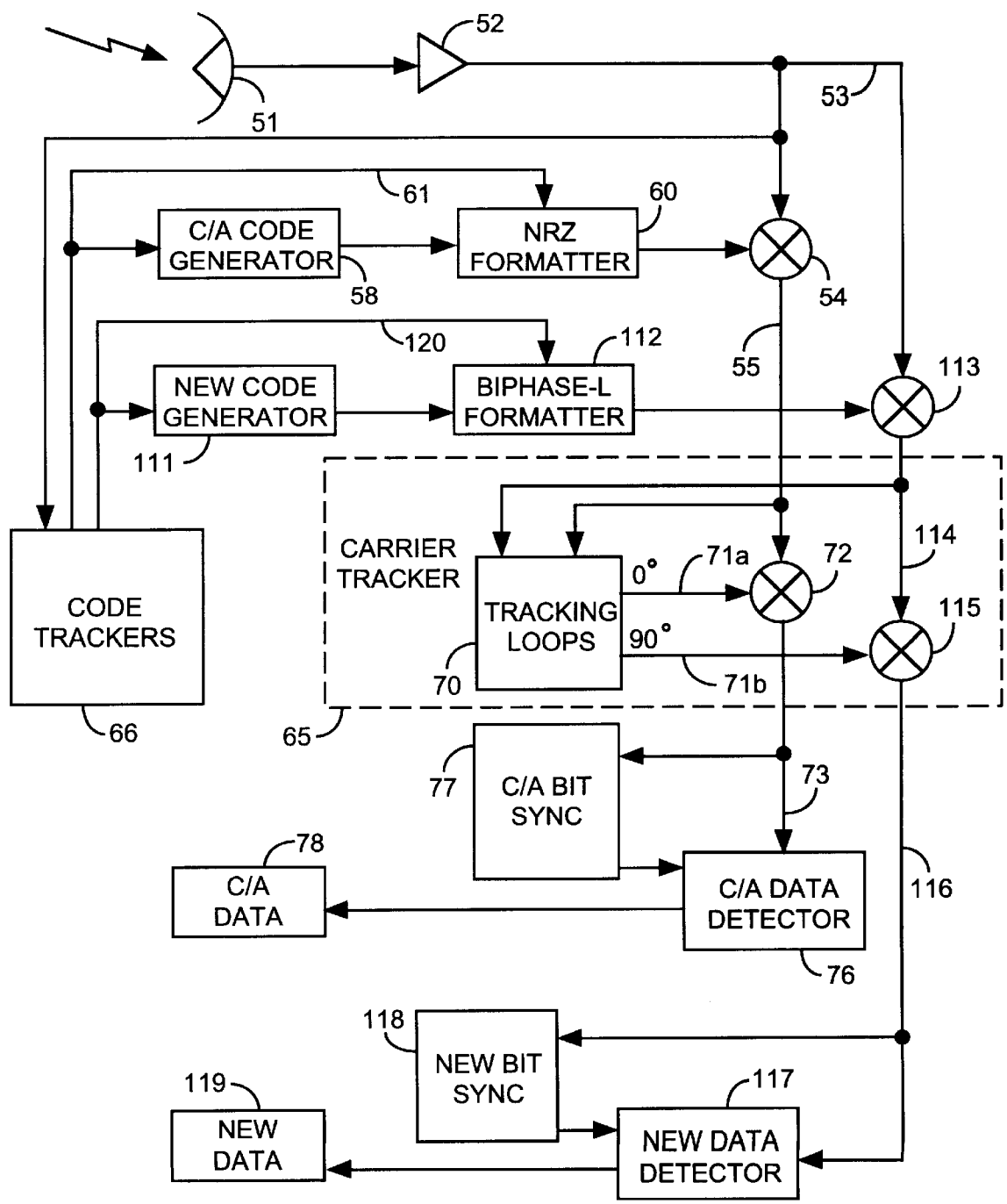
FIG. 3B is a block diagram of an NRZ and Biphase-L formatted quadriphase modulated receiver system.

Referring to FIGS. 1A through 3B, and more particularly to the NRZ and biphase-L formatted quadriphase modulated receiver system of FIG. 3B, the received NEW code signal is first despread using a NEW code generator 111, a biphase-L formatter 112, and a despreader 113 providing a NEW code despread signal 114. A NEW code demodulator 115 demodulates the NEW Code despread signal 114 into a NEW Code signal 116 at baseband using the carrier signal 71b. The C/A data is detected as is the C/A data 78 using C/A data detector 76 and C/A bit synchronizer 77. The NEW demodulated signal 116 is communicated to a NEW data detector 117 and a NEW bit synchronizer 118 for detecting the NEW data 119. In the preferred form, the NEW code reference is generated using a 5.115 MCPS chipping signal 120 provided by the code tracker 66 from the received L band signal 53.

Figure 4A:
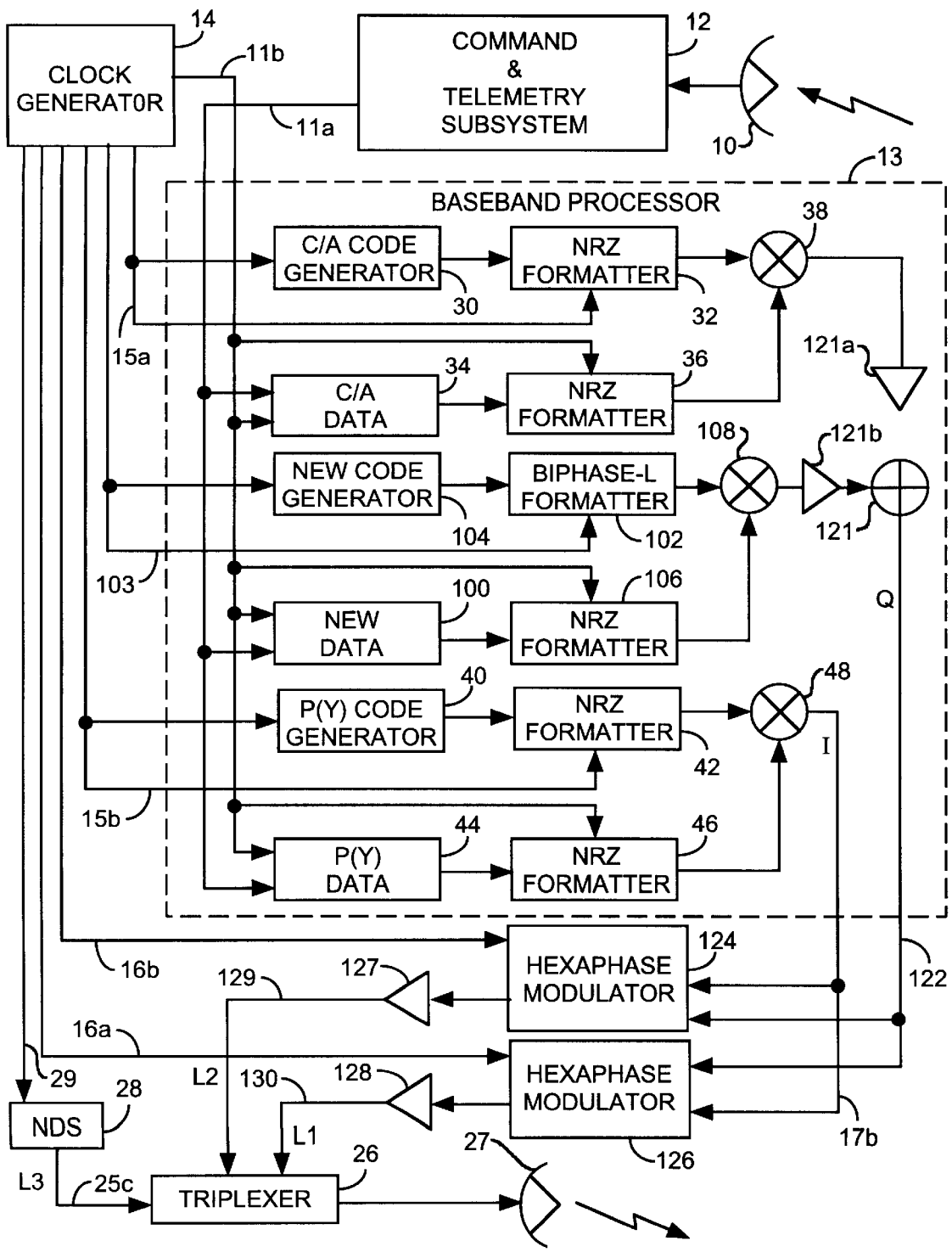
FIG. 4A is a block diagram of an NRZ and Biphase-L formatted hexaphase modulated transmitter system.

Referring to FIGS. 1A through 4A, and more particularly to the NRZ and biphase-L formatted hexaphase modulated transmitter system of FIG. 4A, the baseband processor 13 generates three CDMA code signals, preferably the C/A code, the P(Y) code and the NEW Code. The CDMA codes are generated by generators 30, 100 and 40 using respective chipping rate signals 15a, 103 and 15b. Preferably, the C/A code and P(Y) code are NRZ formatted using respective generators 30 and 40 and respective NRZ formatters 32 and 42. Preferably, the NEW code is biphase-L formatted using the generator 100 and the biphase-L formatter 102. All of the data sets, such as the C/A data 34, P(Y) data 44 and NEW data 104 are NRZ formatted, using the fifty bps clock 11b from the clock generator 14. As such, the C/A code signal and the P(Y) signal retain backward compatible formatting on the L1 band. The three spreaders 38, 108 and 48 provide C/A, NEW and P(Y) code spread spectrum signals. The summer 121 adds two spread spectrum signals from spreaders 38 and 108 to provide the Q phase signal 122. The arithmetic summer 121 combines a scalar 121a weighted NRZ formatted spread spectrum signal with a scalar 121b weighted biphase-L formatted spread spectrum signal to provide the combined Q phase spread spectrum signal 122. The weightings are set to one for hexaphase modulation. Preferably, the I phase spread spectrum signal 17b is a CDMA code NRZ formatted signal, such as the P(Y) code spread spectrum signal 17b. Differing combinations could be used, such as, swapping the NEW and P(Y) code signals in the Q and I quadrature spread spectrum signal 122.

The combined Q phase spread spectrum signal 122 and the I phase spread spectrum signal 17b are both communicated to hexaphase modulators 124 and 126 respectively driving amplifiers 127 and 128 respectively providing an L1 band signal 130 and an L2 band signal 129. The amplifiers 127 and 128 are used to provide the proper transmission power on both L1 and L2 bands for hexaphase or octaphase modulation. The L1 and L2 band signals 129 and 130 each include the three CDMA code signals modulated on respective carriers 16b and 16a. The hexaphase modulators 124 and 126 modulate the respective carriers 16a and 16b by the C/A, P(Y) and NEW CDMA code signals. The L1 and L2 band signals are combined by triplexer 26 and transmitted by antenna 27.

Figure 4B:
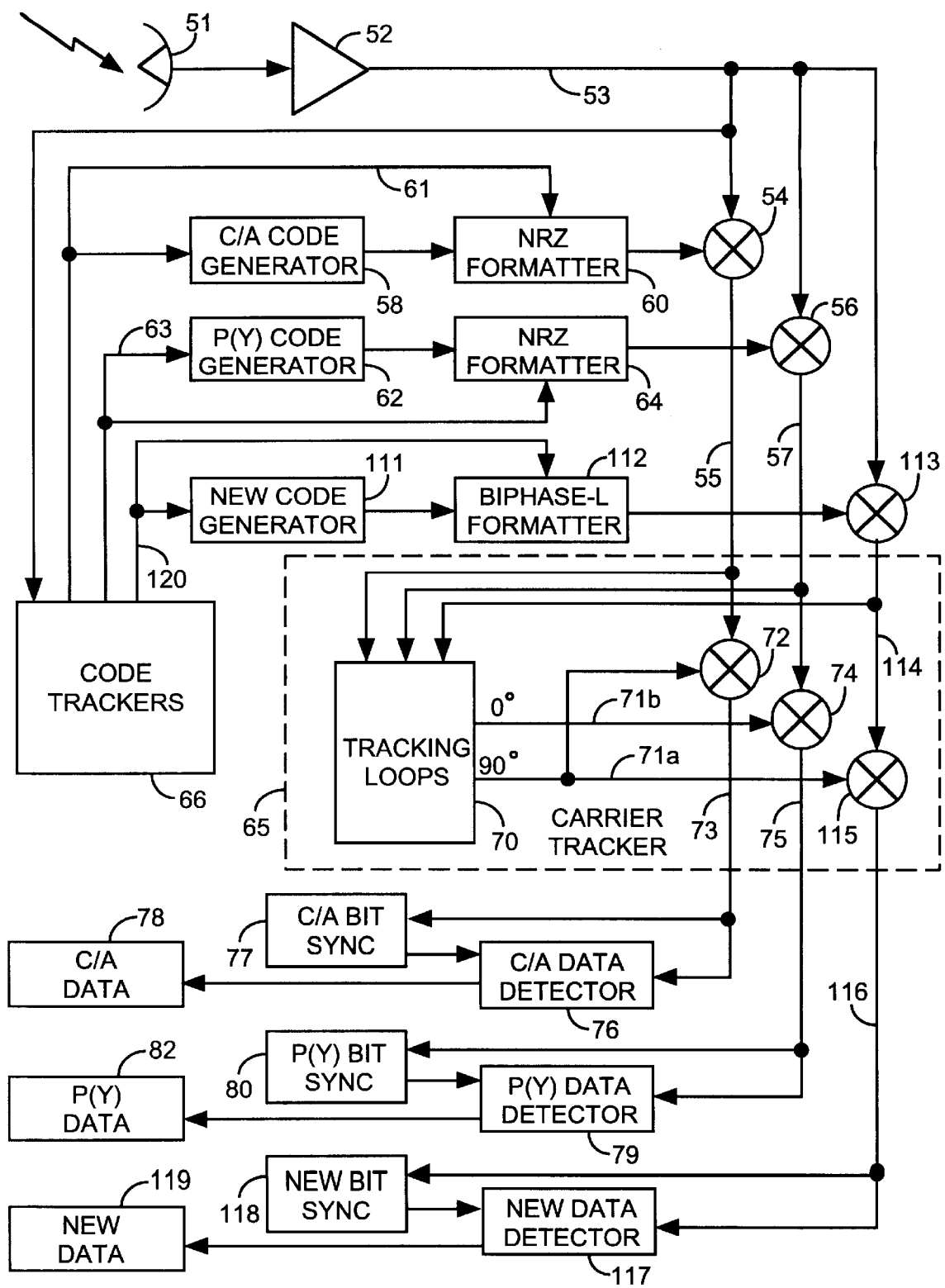
FIG. 4B is a block diagram of an NRZ and Biphase-L formatted hexaphase modulated receiver system.

Referring to FIGS. 1A through 4B, and more particularly to the NRZ and biphase-L formatted hexaphase modulated receiver system of FIG. 4B, one of the L1 or L2 band signals 130 and 129 of FIG. 4A is received carrying the C/A, P(Y) and NEW Code signals which are respectively despread using generators 58, 62 and 111 and formatters 60, 64 and 112 respectively clocked by chip rate signals 61, 63 and 120, providing respective formatted code signals respectively to despreaders 54, 56 and 113 providing respective C/A, P(Y) and NEW despread signals 55, 57 and 114. The carrier tracker 65 is modified to include three demodulators 72, 74 and 115 for demodulating the L1 band carrier from the three despread signals 55, 57 and 114 to provide respective C/A, P(Y) and NEW demodulated signals 73, 75 and 116.

The ninety degree carrier signal 71b and the zero degree carrier signal 71a are communicated to the C/A code and NEW code demodulators 115 and 72. The C/A codes and NEW code signals were added together by summer 121 of FIG. 4A and modulated on the Q phase prior to transmission, whereas the in phase carrier 71b is communicated to the P(Y) code demodulator 74 for demodulating the P(Y) code signal which was modulated on the I phase, using the hexaphase modulators 124 and 126 of FIG. 4A. The C/A, P(Y) and NEW code demodulated signals 73, 75 and 116 are communicated to respective detectors 76, 79 and 117 and bit synchronizers 77, 80 and 118 for detecting the C/A data 78, P(Y) data 82 and NEW data 119.

Figure 5A:
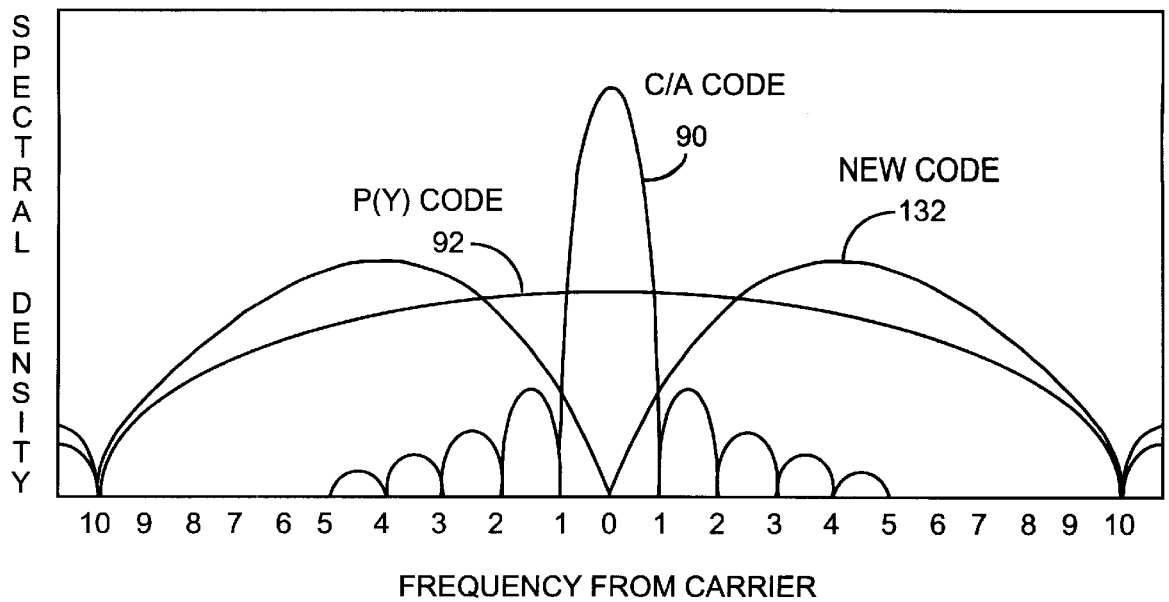
FIG. 5A is a graph of the spectral density of the C/A, P(Y) and NEW code signals.
Figure 5B:
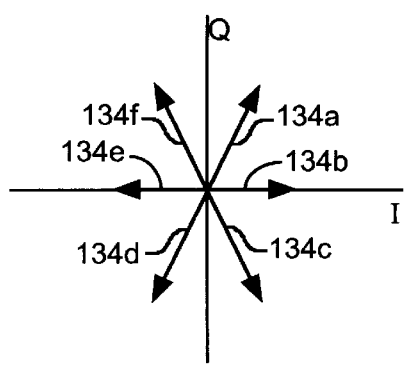
FIG. 5B is a graph of vectors for hexaphase signaling.
Figure 5C:
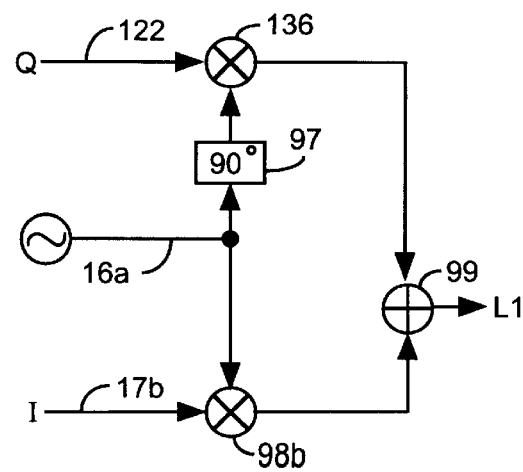
FIG. 5C is a block diagram of an L1 hexaphase modulator.

Referring to all the Figures, and more particularly to FIGS. 5A, 5B and 5C, the spectral density 132 of the exemplar NEW code signal. As shown, the NEW code spectral component 132 will have a null at the carrier frequency. As such, an interfering signal on the carrier might render the C/A and P(Y) codes signals unsuitable for reliable navigation, yet not substantially interfere with the NEW code signal. The hexaphase modulators 124 and 126 of FIG. 4A operate in quadrature and provide for six signaling vectors 134a–f, such for spectral separation of the quadrature signals. Eight vectors are generated in the case of octaphase modulation. As shown, two I phase vectors 134e and 134b are for signaling the P(Y) code signal as are quadriphase vectors 96a and 96c of FIG. 2B. However, the two phase shifted Q phase vectors 96b and 96d are each respectively split into two hexaphase Q phase vectors 134f and 134a, and 134d and 134c. The hexaphase modulators 124 and 126 in FIG. 4A use a mixer 136 to modulate the Q spread spectrum signal 122 containing both the C/A and NEW code signals.

The three code hexaphase modulation provides for adding the C/A code signal to the L2 band and for adding the NEW code to both the L1 and L2 bands. Preferably, the C/A code and data remain NRZ formatted, while the NEW code is biphase-L formatted and the NEW data is NRZ formatted. The resulting spectrum will have a C/A code spectral component 90, a P(Y) code spectral component 92 and a NEW code spectral component 132. When the power level of both C/A code signal and the NEW code signal are equal, the result is a three code hexaphase modulation for which the component power spectral densities are shown in FIG. 5A. When the power levels are arbitrary, octaphase signaling results.

The quadrature phase of both the L1 and the L2 carrier will be shared between the C/A and the NEW codes with reduced spectral overlap as compared to the spectral overlap of the C/A code to the P(Y) code. The C/A and the P(Y) codes retain NRZ formatting for backward compatibility with current GPS receivers, but the addition of the NEW code will require modifications to both the transmitter and receiver systems. The NRZ and biphase-L formatting use two scaled levels, +1 and −1. The average value of a signal formatted by the biphase-L format is zero over one C/A code chip period thereby introducing a spectral null at the carrier frequency. The time orthogonality of the NRZ and biphase-L formatted waveforms for the C/A and the NEW codes is used to place both codes on the same carrier phase with minimum cross coupling interference so that the C/A code data and the NEW code data can be separated upon reception. Existing GPS receivers will be able to track the C/A code with minimal degradation in tracking performance due to the existence of the NEW code being transmitted along with the C/A and the P(Y) codes.

Figure 1A:
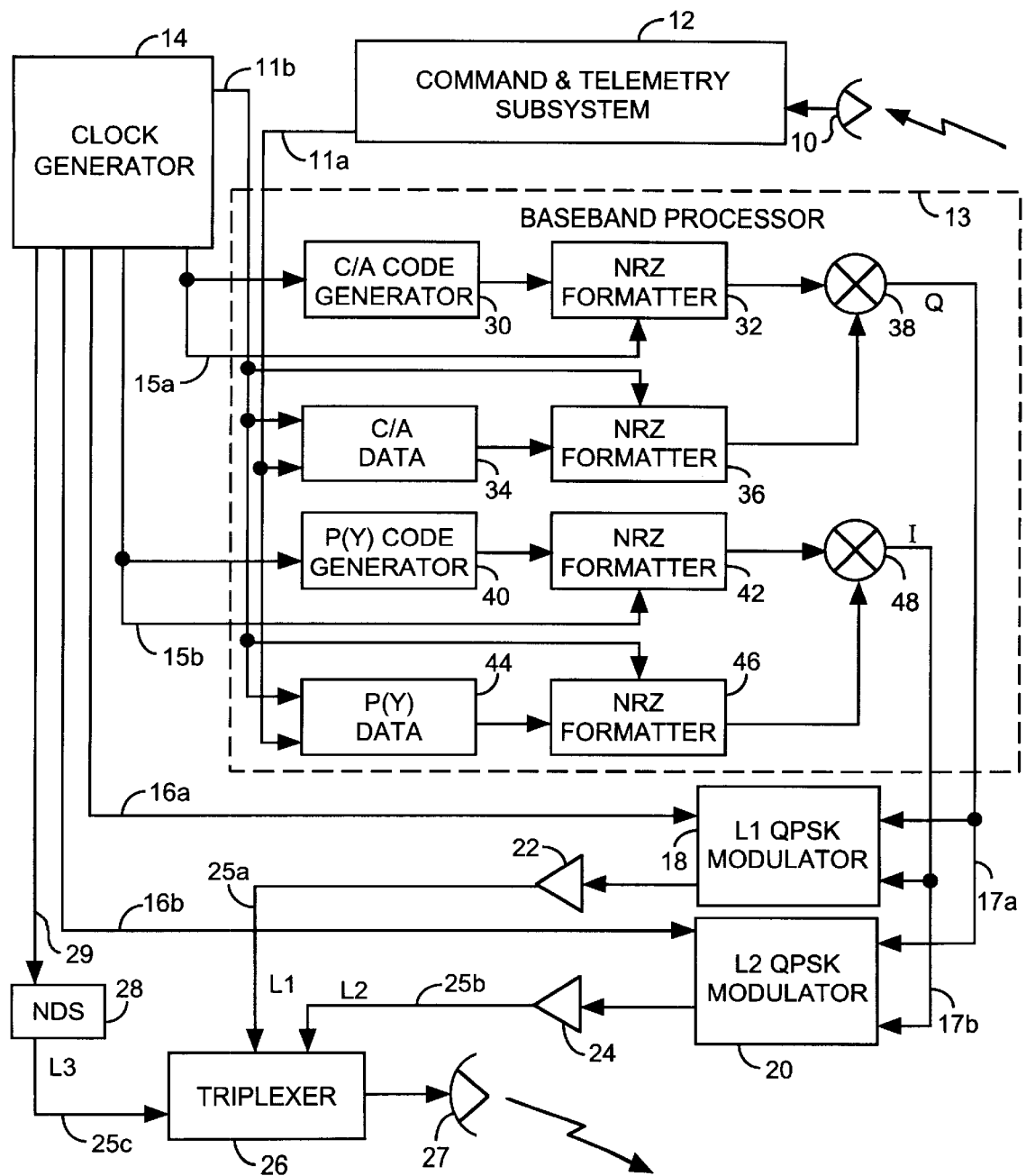
FIG. 1A is a block diagram of a prior art NRZ formatted quadriphase modulated transmitter system.
Figure 1B:
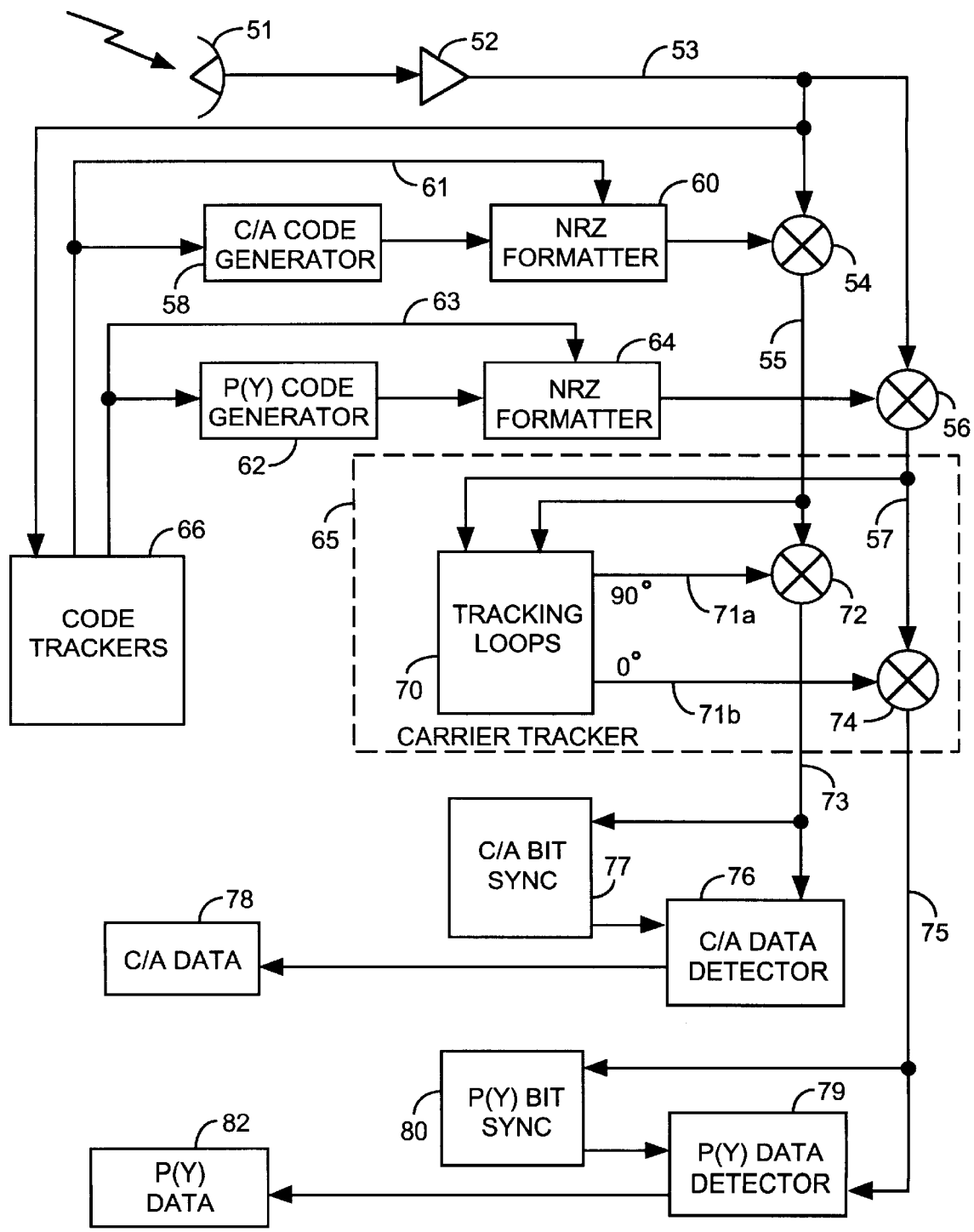
FIG. 1B is a block diagram of a prior art NRZ formatted quadriphase modulated receiver system.
Figure 2A:
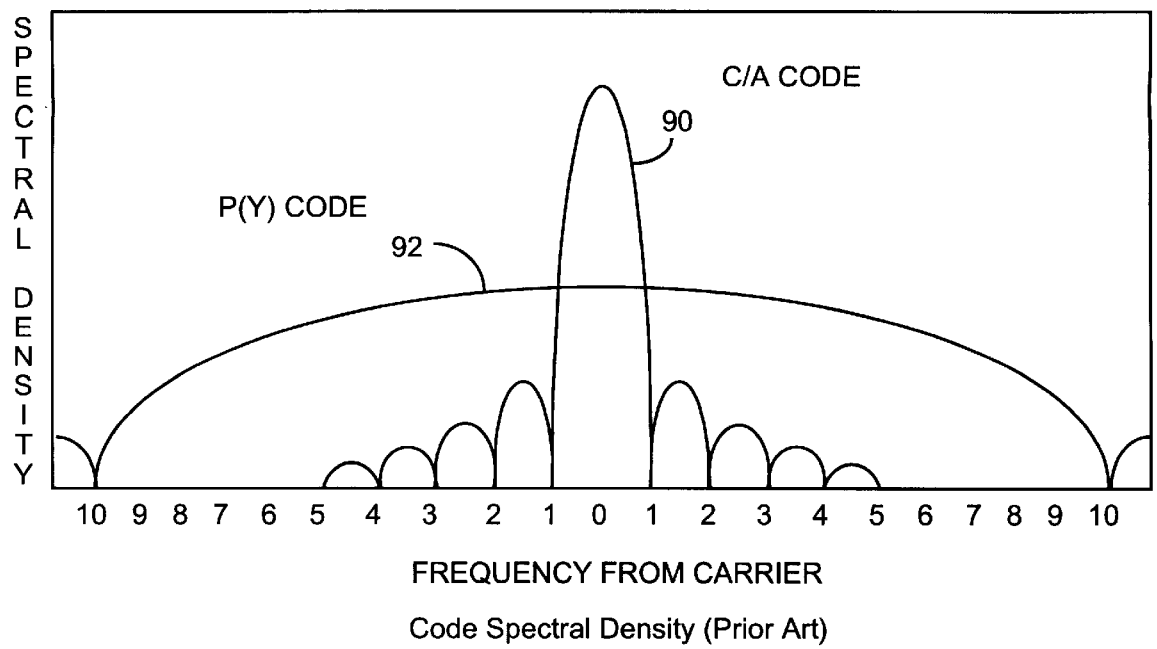
FIG. 2A is a graph of prior art spectral density of C/A and P(Y) code signals.
Figure 2B:
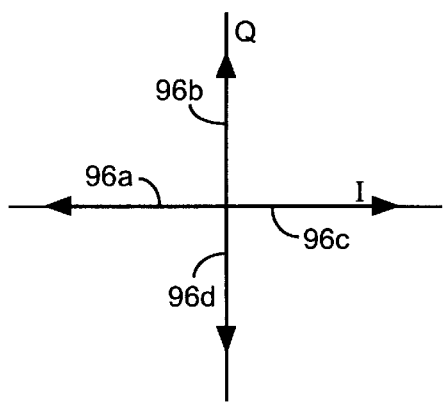
FIG. 2B is a graph of prior art vectors for quadriphase signaling.
Figure 2C:
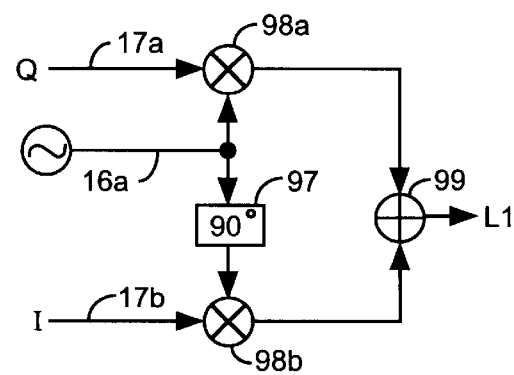
FIG. 2C is a block diagram of a prior art L1 QPSK modulator.

In the hexaphase modulation receiver system of FIG. 4B, the P(Y) and C/A code signals are despread using code generators 58 and 62 and NRZ formatters 60 and 64 similar to the despreading of the receiver system of FIG. 1B. However, despreading the NEW code is accomplished using the NEW biphase-L formatter 112. The despread signals 73, 75 and 115 are communicated to respective C/A, P(Y) and NEW data detectors 76, 79 and 117 which respectively integrate over the bit time and detect the average waveform for bit detection producing the desired respective bit sequences for providing C/A, P(Y) and NEW data 78, 82 and 119.

Spectral power densities can be determined to insure proper transmission and reception. Let S(t) denote the tri-code hexaphase modulated signal using random data. The modulated signal can be expressed in the following equation.

$$S(t) = (A_{P(Y)}C_{P(Y)}(t)d_{P(Y)}(t)\cos(\omega t) + A_{C/A}C_{C/A}(t)d_{C/A}(t)\sin(\omega t) + A_{NEW}C_{NEW}(t)d_{NEW}(t)\sin(\omega t))$$

In the S(t) equation, $d_{P(Y)(t)}$ equals $d_{C/A}(t)$ which equal +1 or −1 for navigation data bits on the P(Y) and C/A code signals. $d_{NEW}(t)$ is equal to +1 or −1 and may be arbitrary new message bits. $C_{C/A}(t)$ is equal to +1 or −1 and is the C/A code spread at 1.023 MCPS in NRZ format. $CP(Y)(t)$ is equal to +1 or −1 and is the P(Y) code spread at 10.23 MCPS in NRZ format. $C_{NEW}(t)$ is equal to +1 or −1 and is the NEW code spread at 5.115 MCPS in biphase format. $A_{C/A}$ is equal to the square root of $2 \times P_R \times \alpha_{C/A}$, where $\alpha_{C/A}$ is the C/A code fractional power of the total power and where $P_R$ is the total received average power. $A_{P(Y)}$ is equal to the square root of $2 \times P_R \times \alpha_{P(Y)}$, where $\alpha_{P(Y)}$ is the P(Y) code fractional power of the total power. $A_{NEW}$ is equal to the square root of $2 \times P_R \times \alpha_{NEW}$, where $\alpha_{NEW}$ is the NEW code fractional power of the total power. When the power content of the C/A code and the NEW code are equal, the above S(t) equation can be rewritten in a more compact form.

$$S(t) = A_{P(Y)}C_{P(Y)}(t)d_{P(Y)}(t)\cos(\omega t) + A_{C/A}(C_{C/A}(t)d_{C/A}(t) + C_{NEW}(t)d_{NEW}(t))\sin(\omega t)$$

Because $C_{C/A}(t)$, $C_{NEW}(t)$, $d_{C/A}(t)$ and $d_{NEW}(t)$ can have values equal to +1 or −1, the term $(C_{C/A}(t) d_{C/A}(t) + C_{NEW}(t) d_{NEW}(t))$ can have values equal to +2, 0 or −2. That is, the amplitude of the $A_{P(Y)} C_{P(Y)}(t) d_{P(Y)}(t) \cos(\omega t)$ term can be either $+A_{P(Y)}$ or $-A_{P(Y)}$, and the amplitude of the $A_{C/A} (C_{C/A}(t) d_{C/A}(t) + C_{NEW}(t) d_{NEW}(t)) \sin(\omega t)$ term can be $+2A_{C/A}$, $-2A_{C/A}$ or zero. The resulting signal has therefore, six phasor vectors 134a–f, as shown in FIG. 5B for hexaphase signaling. If the C/A code and NEW code power are not equal it can be shown from the S(t) equation that the number of resulting phase vectors 134 will be equal to eight resulting in octaphase signaling.

Hexaphase modulation provides a higher degree of spectral separation between the C/A and NEW codes than the C/A and P(Y) codes thereby minimizing the amount of interference into the C/A code receivers. The cochannel interference from the P(Y) and the NEW Codes onto the C/A code is the amount of interference power passing through the 50 bps C/A data detector and is about 12 dB less for the biphase-L formatted NEW code than from the P(Y) code which is NRZ formatted for the same P(Y) and NEW code power levels. Without making any other modification other than changing the format from NRZ to biphase-L, the power of the NEW code can be increased by 12 dB to achieve additional interference protection yet maintaining the current level of performance for the C/A code receivers. The degradation in the carrier to noise power spectral density ratio, $C/N_o$ due to cochannel interference from the P(Y) or NEW codes is a function of P(Y) or NEW code power to C/A code power ratio.

The NRZ and biphase-L formatting transmission method enables modulating a NEW code signal on the GPS L band and also provides backward compatibility to the existing C/A and P(Y) code receivers. The hexaphase modulation enables the NEW C/A and P(Y) code signal to be transmitted in the L1 band with spectral isolation between the NEW code signal and the C/A code signal. The hexaphase modulation also enable the inclusion of the C/A code signal on the L2 band with the NEW and P(Y) code. Those skilled in the art can make enhancements, improvements and modifications to enhance the invention. However, those enhancements, improvements and modifications may nonetheless fall within the spirit and scope of the following claims.

What is claimed is:

1. A transmission method for spectral separation of a first and a second modulated spread spectrum signals transmitted over a bandwidth having center carrier frequency, the method comprising the steps of, first code generating a first code signal,
first code NRZ formatting the first code signal,
first data generating a first data,
first data NRZ formatting the first data,
first providing a first spread spectrum signal from the NRZ formatted first code signal and the NRZ formatted first data,
second code generating a second code signal,
second code NRZ formatting the second code signal,
second data generating a second data,
second data NRZ formatting the second data,
second providing a second spread spectrum signal from the NRZ formatted second code signal and the NRZ formatted second data,
third code generating a third code signal,
third code biphase-L formatting the third code signal,
third data generating a third data,
third data NRZ formatting the third data,
third providing a third spread spectrum signal from the biphase-L formatted third code signal and the NRZ formatted third data,
fourth providing a fourth spread spectrum signal from the second and third spread spectrum signals,
providing first and fourth modulated spread spectrum signals from the first and fourth spread spectrum signals modulated in quadrature at the center carrier frequency within the bandwidth, and
broadcasting the modulated first and fourth spread spectrum signals over the bandwidth at the center carrier frequency, the second spectrum signal has a spectral null at a spectral maximum of the third spread at the center carrier frequency for separating the second and fourth modulated spread spectrum signals.

2. The method of claim 1 wherein,
the first code generating step generates a P(Y) code signal, the second code generating step generates a C/A code signal, the third code generating step generates a NEW code signal, and the bandwidth covers an L1 bandwidth.

3. The method of claim 1 wherein,
the first code generating step generates a P(Y) code signal at a 10.23 MCPS rate,
the second code generating step generates a C/A code signal at a 1.023 MCPS rate,
the third code generating step generates a NEW code signal at a 5.115 MCPS rate, and
the bandwidth covers an L1 bandwidth.

4. The method of claim 1 wherein,
the first code generating step generates a P(Y) code signal at a 10.23 MCPS rate,
the second code generating step generates a C/A code signal at a 1.023 MCPS rate,
the third code generating step generates a NEW code signal at a 5.115 MCPS rate, and
the bandwidth covers an L2 bandwidth.

5. The method of claim 1 wherein,
the second and third modulated spread spectrum signals have equal power level when broadcasted, and
the first, second and third modulated spread spectrum signals hexaphase modulate the carrier frequency.

6. The method of claim 1 wherein,
the second and third modulated spread spectrum signals have unequal power level when broadcasted, and
the first, second and third modulated spread spectrum signals octaphase modulate the carrier frequency.

7. A communication method for transmitting and receiving first, second and third modulated spread spectrum signals within a bandwidth having center carrier frequency, the method comprising the steps of,
first code generating a first code signal,
first code NRZ formatting the first code signal,
first data generating a first data,
first data NRZ formatting the first data,
first providing a first spread spectrum signal from the NRZ formatted first code signal and the NRZ formatted first data,
second code generating a second code signal,
second code NRZ formatting the second code signal,
second data generating a second data,
second data NRZ formatting the second data,
second providing a second spread spectrum signal from the NRZ formatted second code signal and the NRZ formatted second data,
third code generating a third code signal,
third code biphase-L formatting the third code signal,
third data generating a third data,
third data NRZ formatting the third data,
third providing a third spread spectrum signal from the biphase-L formatted third code signal and the NRZ formatted third data,
providing first, second and third modulated spread spectrum signals from the first, second and third spread spectrum signals modulated in quadrature at the center carrier frequency within the bandwidth,
broadcasting the modulated first, second and third modulated spread spectrum signals over the bandwidth at the center carrier frequency, the second modulated spread spectrum signal has a spectral null at a spectral maximum of the third modulated spread spectrum signal at the center carrier frequency for separating the second and third modulated spread spectrum signals,
receiving the modulated first, second and third modulated spread spectrum signals over the bandwidth at the center carrier frequency,
providing a first despread modulated signal from the first modulated spread spectrum signal,
providing a second despread modulated signal from the second modulated spread spectrum signal,
providing a third despread modulated signal from the third modulated spread spectrum signal,
providing a first demodulated signal from the third despread modulated signal,
providing a second demodulated signal from the second despread modulated signal,
providing a third demodulated signal from the third despread modulated signal,
providing the first data from first demodulated signal,
providing the second data from the second modulated signal, and
providing the third data from the third modulated signal.

8. The method of claim 6 wherein,
the first code generating step generates a P(Y) code signal, the second code generating step generates a C/A code signal, the third code generating step generates a NEW code signal, and the bandwidth covers an L1 bandwidth.

9. The method of claim 6 wherein, the first code generating step generates a P(Y) code signal at a 10.23 MCPS rate, the second code generating step generates a C/A code signal at a 1.023 MCPS rate, the third code generating step generates a NEW code signal at a 5.115 MCPS rate, and the bandwidth covers an L1 bandwidth.

10. The method of claim 6 wherein, the first code generating step generates a P(Y) code signal at a 10.23 MCPS rate, the second code generating step generates a C/A code signal at a 1.023 MCPS rate, the third code generating step generates a NEW code signal at a 5.115 MCPS rate, and the bandwidth covers an L2 bandwidth.

11. The method of claim 6 wherein, the second and third modulated spread spectrum signals have equal power level when broadcasted, and the first, second and third modulated spread spectrum signals hexaphase modulate the carrier frequency.

12. The method of claim 6 wherein, the second and third modulated spread spectrum signals have unequal power level when broadcasted, and the first, second and third modulated spread spectrum signals octaphase modulate the carrier frequency.

* * * * *